April 14, 1959 — N. M. REISINGER — 2,882,332
OUTLET BOX AND TERMINAL BLOCK
Filed June 23, 1955
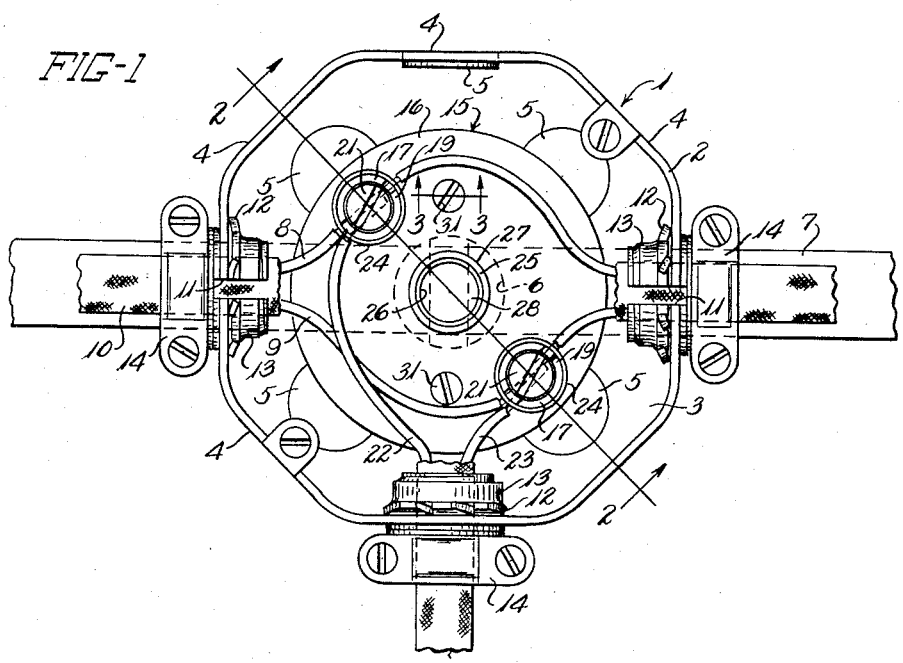
INVENTOR.
NORMAN M. REISINGER
BY
Oldham & Oldham
ATTYS.

United States Patent Office 2,882,332
Patented Apr. 14, 1959

2,882,332

OUTLET BOX AND TERMINAL BLOCK

Norman M. Reisinger, Grafton, Ohio

Application June 23, 1955, Serial No. 517,437

3 Claims. (Cl. 174—59)

This invention relates to electrical fixtures, and it especially relates to electric outlets and terminal blocks at which point connections are made between power supply lines and individual electrical outlet wires.

Heretofore substantially standard metal outlet boxes have been used in construction and electrical installations for many years. These outlet boxes comprise a substantially cup-shaped metal receptacle that has a plurality of removable discs provided therein which are easily knocked out or removed from the remainder of the metal box to facilitate threading wires through or leading them into the metal receptacle for connection to other electrical wires. In previous assembly and construction work, usually these outlet boxes have had various connections made therein by soldered connections between the ends of different wires, or the wires might be secured together by electrical tape, by wire nuts or other means.

One problem that frequently arises after an electrical installation is completed is that a continuous wire may be desired to be tapped to connect a special or additional electric outlet thereto. Insofar as I am aware, in all previous instances it has been necessary to cut the electric wire; and usually splice another little piece of wire into the line, and then make the usual type of connection in an outlet receptacle or box into which the severed ends of the wire extend for connection to other wires.

While the electric terminal or outlet boxes used heretofore have been fairly satisfactory from a safety and construction viewpoint, it has been difficult or impossible for the unskilled worker to make connections in such an electric outlet box when he desires to change his electric wiring, as to add an extra connection thereto, etc.

The general object of the present invention is to provide a new and improved type of an outlet receptacle box wherein it is easy to connect wires therein for outlet wires to extend therefrom.

Another object of the invention is to provide novel type of a terminal block for use in an electric outlet box wherein power lines and lead outlet lines can be mechanically safely and permanently secured in position in the receptacle box.

A further object of the invention is to provide a molded type of terminal block wherein the block can be used to secure a terminal box in position and to secure a light fixture in place.

Yet another object of the invention is to provide an improved type of a terminal block that specifically is adapted for receiving continuous wires therein and facilitating the connection of other wires thereto in an electrically safe, permanent manner.

The foregoing and other objects and advantages of the invention will be made more apparent as the specification proceeds.

For a better understanding of the invention, reference is made to the accompanying drawings, wherein:

Fig. 1 is a plan view of an electrical terminal block and outlet box embodying the principles of the invention shown with continuous wires connected thereto and extending therefrom;

Fig. 2 is a vertical section taken on line 2—2 of Fig. 1 with part of one terminal sleeve removed and with a portion of the metal receptacle broken away;

Fig. 3 is a veritcal section taken on line 3—3 of Fig. 1 to show the means used for securing the terminal block to a terminal box;

Fig. 4 is a plan view of the modified type of a terminal sleeve of the invention; and Fig. 5 is a side elevation of the terminal sleeve of Fig. 4.

The present invention in general relates to electric outlet boxes and to a terminal block for electric outlet boxes, which terminal block comprises a base of insulation material, a center sleeve having a threaded peripheral surface, a pair of terminal sleeves having threaded bore surfaces with all of said sleeves being embedded in the base and extending from a top surface thereof, the center sleeve being open from the bottom surface of the base for receiving connecting means therein for engaging means for securing the insulation base to an electric outlet box, and other means engage the terminal sleeves to secure wires in transversely extending holes provided in such sleeves.

When referring to corresponding parts in the specification, which parts are shown in the drawings, corresponding numerals are used to facilitate comparison between the specification and drawings.

Attention now is directed to the details of the structure shown in the drawings, and the improved electric terminal box assembly of the invention is indicated as a whole by the numeral 1. This terminal box 1 includes as a major component thereof, a generally cup-shaped box 2 of substantially conventional design. This metal box 2 has a base 3 and walls or side portions 4 thereon. A plurality of metal discs 5 are removably secured to the remainder of the metal box 2 and can easily be punched or knocked therefrom for receiving wires passing therethrough into the metal box 2. These discs 5 are present on both the sides and base of the metal box. The base 3 of the metal box has a central aperture 6 extending therethrough for use in securing the metal box 2 in position on a metal bar 7, as indicated in Fig. 2, inasmuch as these boxes are frequently positioned on metal bars for support thereof.

As an important feature of the invention, the terminal box 1 and associated means are adapted to engage with a continuous wire for securing an outlet thereto with the continuous wire normally being the power supply means for the electric apparatus. Thus continuous wires 8 and 9 are shown connected to and extending through the terminal box 1, which wires have the usual insulation body 10 provided thereover but which insulation is removed within the metal box 2. To facilitate engaging these continuous wires 8 and 9 with the metal box 2, suitable slots 11 are cut or otherwise formed in the walls 4 of the metal box and in a lock nut 12 used for securing a positioning sleeve 13 to the terminal box assembly where each wire enters the metal box. Each positioning sleeve 13 also has the slot 11 extending through the upper portion thereof. The sleeves 13 are also used to anchor clamp bars 14 in the terminal box assembly so that the unit formed of the wires 8 and 9 and insulation cover 10 can be secured effectively to the terminal box assembly in a conventional manner. Thus the wires 8 and 9, when the insulation 10 has been removed therefrom, can easily be slid down through the slots 11 into the positioning sleeve 13 and clamped in position by the clamp bars 14 but separated within the metal box for connection of other wires thereto, as hereinafter described.

Another important element of the invention relates to the insulation type of a terminal block indicated as a whole by the numeral 15 and which terminal block is received within the metal box 2. The terminal block 15 comprises a base 16 made from suitable moldable insulation material, such as a phenolic resin. The terminal block 15 also includes a pair of terminal sleeves 17, 17 which have small flanges 18 on the bases thereof embedded in the base 16 of the terminal block by being molded integrally therewith. The sleeves 17, 17 have split upper ends at 19, as indicated, so that the wires 8 and 9 can be threaded therethrough for receipt in transversely extending, usually enlarged apertures 20 extending transversely of the terminal sleeves but intersecting the slots 19 thereof.

The wires 8 and 9 are held in the terminal sleeves 17, by removable means such as suitable set screws 21 in threaded engagement therewith. Power takeoff leads or wires 22 and 23 connect to the wires 8 and 9, respectively, within the metal box 2 and the individual terminal sleeves provided so that these wires 22 and 23 provide an individual power outlet circuit added to the power wires 8 and 9.

As a feature of the construction that aids in securing the wires firmly in the terminal sleeves 17, lock or safety rings 24 are in telescopic engagement with the upper ends of the terminal sleeves 17 to keep the split end portions thereof from spreading apart and releasing the wires received therein when the set screws 21 are tightened into engagement with the terminal sleeves and wires therein. Obviously these rings 24 are of the correct inside diameter to engage snugly with the periphery of the terminal sleeves 17 when the set screws 21 are threadedly engaged with the terminal sleeves for securing wires thereto.

Another feature of the terminal block 15 resides in a center sleeve 25 embedded therein by the molding action. Such center sleeve 25 preferably is provided with a tapped bore 26 and with a threaded periphery 27. Thus the tapped bore 26, which is exposed on the bottom of the terminal block 15 can be used for threadedly engaging threaded stud 28 having a stirrup 29 that receives the metal bar 7 therein so that the stud 28 can be tightened into engagement with the center sleeve 25 to secure the terminal block 15 and associated metal box 2 firmly to the metal bar 7. Preferably the threaded stud 28 with the metal bar 7 in the stirrup 29 is rotated with relation to the center sleeve 25 to tighten the terminal block 15 into engagement with the metal box 2.

Fig. 2 of the drawings best indicates that the metal discs 5 in the base 3 of the metal box usually extend slightly upwardly therefrom and that the terminal block 15 is firmly positioned or held in place by means of a molded ring 30 extending downwardly from the base portion of the terminal block 15 for engaging the normal flat upper surface of the metal box 2 and spacing the remainder of the terminal block 15 upwardly from these metal discs 5 still positioned on the metal box.

In some instances, it may be desirable to secure the terminal block 15 to the metal box 2 directly. Thus conventional bolt means 31, or similar members, can be used to extend through holes 32 provided in the insulation base 16 and extending through holes in the base 3 of the metal box to be secured thereto by such bolt means 31.

These bolt means 31 can be used alternately, or in addition to the use of the threaded stud 28 for securing the terminal block and metal box 2 together.

A modified type of a terminal sleeve 17a is shown in Figs. 4 and 5. In this instance the sleeve is not provided with any split upper end but it still has a transversely extending aperture 20a therein and preferably has a base flange 18a thereon. Thus a suitable set screw 21a can be engaged with the terminal sleeve 17a and be held firmly in engagement therewith for securing any desired size wires or leads to such terminal sleeve. Such terminal sleeve 17a would be used normally with an outlet box, like the box 2, but where continuous side walls are provided.

It will be realized that in some instances it is desirable to have more than two terminal sleeves provided in one of the terminal block assemblies 15 so that two, three, four or more of such terminal sleeves may be provided in a terminal block of the invention.

The terminal box assembly of the invention and terminal block member provided may be used in either new or repair installations, as desired. The terminal block 15 is particularly effective to be added to existing electrical installations and can be added thereto with a minimum of change or alteration in the electric circuits provided.

If desired, the threads provided on the periphery of the center sleeve 25 can be used for securing light fixtures to the terminal block 15 so that such center sleeve has a dual function in the assembly.

The terminal block is of sturdy construction and relatively inexpensive to produce and can be easily mounted in fixed relationship to a positioning metal box. In view of the foregoing, it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What is claimed is:

1. An electric terminal box comprising a generally cup-shaped metal box having a pair of opposed wire receiving openings in the sides thereof and a center opening in the base thereof, a terminal block body made of insulating material, and a center sleeve embedded in said terminal block and having a tapped bore extending completely through said terminal block and a threaded periphery extending upwardly of said terminal block beyond the surface of insulation block, a threaded stud engaging said sleeve and extending downwardly therefrom, said stud having a stirrup on its lower end protruding from said metal box for engaging a member to position said box, a pair of terminal sleeves molded into and carried by said terminal block extending upwardly therefrom, said terminal sleeves having tapped bores and split upper ends so that a continuous wire can be received in said openings in said metal box and be engaged with said terminal sleeves, set screws engaging said terminal sleeves for retaining wires therein, and rings telescopically engaging the split ends of said terminal sleeves to hold said set screws in firm engagement with said terminal sleeves.

2. An electric terminal box comprising a generally cup-shaped metal box having a pair of opposed wire receiving openings in the sides thereof and a center opening in the base thereof, a terminal block body made of insulating material, and a center sleeve secured to said terminal block, said center sleeve having a tapped bore exposed at the bottom of said terminal block, a threaded stud engaging said sleeve and extending downwardly therefrom, said stud having a stirrup on its lower end protruding from said metal box for engaging a member to position said box, a pair of terminal sleeves molded into and carried by said terminal block extending upwardly therefrom, said terminal sleeves having split upper ends so that a continuous wire can be received in said openings in said metal box and be engaged with said terminal sleeves, and means securing wires in firm engagement with said terminal sleeves.

3. A terminal box as in claim 2 wherein terminal block has an annular bottom rib surrounding said center sleeve and providing a support surface for said block.

References Cited in the file of this patent

UNITED STATES PATENTS

| | | |
|---|---|---|
| 1,777,291 | Clayton | Oct. 7, 1930 |
| 1,837,955 | Ely | Dec. 22, 1931 |
| 2,088,481 | Mylius | July 27, 1937 |
| 2,463,034 | Harnett | Mar. 1, 1949 |
| 2,533,673 | Lasserre | Dec. 12, 1950 |
| 2,659,765 | Dunn | Nov. 17, 1953 |

FOREIGN PATENTS

| | | |
|---|---|---|
| 644,719 | Germany | May 12, 1937 |
| 675,543 | Germany | Apr. 21, 1939 |
| 693,462 | Great Britain | July 1, 1953 |